Patented June 1, 1926.

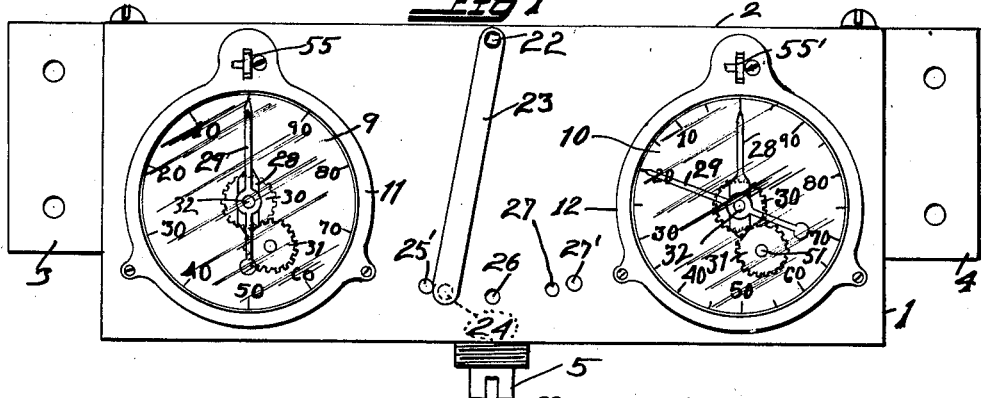

1,587,162

UNITED STATES PATENT OFFICE.

WILLIAM N. LINDBLAD, OF BERKELEY, CALIFORNIA.

MACHINE FOR MEASURING CONSECUTIVE DISTANCES.

Application filed May 7, 1923. Serial No. 637,068.

This invention relates to a machine for measuring consecutive distances, and its object is to provide means whereby a series of consecutive distances may be measured from an automobile without stopping the machine.

It will be understood by those skilled in the art that it is convenient to measure pole spacings with an automobile, but no measuring device suitable for this work is available.
With an ordinary odometer it is necessary that the automobile be stopped at the end of each spacing to read the measure and to reset it, a process so laborious that measurements with a tape measure are made in preference.

In the present case means is provided to reset the indicator hands without stopping the machine, following the readings of the successive measurements, the resetting being accomplished when the other indicators are accumulating the given measurement.

The shift from one set of indicators to the other is made so quickly there is no appreciable loss in measurement.
Other objects of the invention will appear as the description proceeds.

An embodiment of the invention is shown in the accompanying drawings in which the same reference numeral is applied to the same portion throughout, but I am aware that there may be modifications thereof.

Fig. 1 is a front elevation of the apparatus.

Fig. 2 is a vertical sectional view through the casing of the machine showing the resetting means, and Fig. 3 is a vertical sectional view of the casing for the machine showing the driving gears, Fig. 4 is an enlarged detail of the means for resetting the indicating hands to zero.

Fig. 5 is a horizontal section showing the position of the driving gears.

The numeral 1 represents a rectangular casing having the detachable cover 2 and being provided with two ears 3 and 4 for securing it on the dash-board of the vehicle, the vehicle which has a common form of gearing extending from its wheels to a flexible shaft which is provided with a coupling to be connected to the coupling 5, forms no part of the present invention.

The coupling 5 is supported by a shaft 6 which is revolubly mounted in a bearing 7 connected to the front of the casing enclosing the gearing.

The front of the casing is provided with two dials 9 and 10 each of which has a glass to cover the operating apparatus, said glass being held in place by means of the rings 11 and 12, which rings are secured to the casing front. The back and front of the casing are connected together by means of four rods 13 to 16 inclusive near the top, and these rods support two slides 17 and 18, said slides being movable longitudinally of the casing on the rods 13 to 16 inclusive. Each of these slides is provided with a link as shown at 19, and 20, said links in turn being connected to an arm 21 on a shaft 22, which shaft carries a lever 23 on the front of the machine.

The lever 23 has a ball-snap 24 which engages any one of the holes 25, 26, and 27 on the front of the machine, said snap serving to hold the operating mechanism either engaged with either of the indicating hands or disengaged therefrom as may be desired.

Each dial has an indicating hand 28 being geared to rotate at one-tenth of the speed of the hand 29. The hand 28 is carried by a gear 30 which is in mesh with the gear 31, both being on the front of the dial, and said gears are duplicated on each dial.

While the hand 28 is carried by the sleeve to which the gear 30 is connected and which sleeve is revoluble on the shaft 32, the connection is sufficiently loose to permit the hand to be reset to zero without disturbing the position of the gear which normally drives it.

Each dial is provided with a shaft 32, one of said shafts being driven by the gear 33 and the other by the gear 34. These gears are in turn respectively in mesh with smaller gears 35 and 36, the two latter gears being slightly displaced from one another to prevent them from intefrering with one another.

Near the top of the casing and supported to rotate on the shaft 37 is a frame 38, which frame carries the two pinions 39 and 40. Pins 41, 42 extend into slots at the back of the casing 1 to provide for the smooth working of the frame 38. This frame is shifted from one position to another by means of a shoe 43 which is carried by the shaft 22, and which bears upon bar 38 on both sides of its supporting shaft to turn the gears 39 and 40 in turn into engagement with the gear 35 or 36 to drive the indicating hands 28, 29.

The shaft 37 carries a bevel wheel 44 in engagement with a small bevel pinion 45 on the shaft 5.

The arrangement of the gears 39 and 40 is such that said gears may be moved into or out of engagement with the gears 36 at will without disturbing the engagement of the gears 44 and 45, whereby either one pair or the other pair of indicating hands may be driven.

Each shaft 32 has a heart-shaped cam as indicated at 47 and 48 with which knife edge levers 48 and 49 contact. Said levers are for the purpose of resetting the hands 29.

The shafts 50, 51 are each provided with a gear as illustrated in 52, 53, and each of these shafts is provided with a resetting cam as indicated at 53, 54. Pivotally mounted at the top of each dial are the handles 55 and 55′; said handles passing through the slidable members 17 and 18 inside the casings of the apparatus and being carried by the slidable members 56—57, which latter are normally held in the position shown in Figure 2 by means of the flat springs 58, 59, secured to the posts 60, 61. (See Figure 2.) It will be seen that the resetting device can only push the members 56, 57 down when either of the lugs 62 happen to be free to move downwardly in the bayonet joint slot in the lower side of the members 17 and 18. Each member 56, 57 has one of the lugs 62.

The four levers 48′ are pivotally mounted on the casing and they act upon the two cams 53 and on the cams 47, 48 to reset the four hands. They are connected to the operating slides 56 and 57 by the springs 65, 66, of which there are two each. The slides 56 and 57 each have a slot as shown at 63 and 64 to hold them in their proper places.

The operation is as follows:

Assuming the shaft coupling 5 to be coupled to a suitable rotating shaft connected with the driving gear of a motor or other vehicle, the lever 23 is pulled to the right or left as may be convenient, whereupon the corresponding counter will begin to register distances, and as soon as a given distance is reached, the operator snaps the lever 23 to the other position. The errors thus produced amount to very little since the change in the gearing from one position to the other takes place almost instantly on account of the snapping of the lever 23 from one position to another position. The pins 25′ and 27′ prevent said lever from moving more than the proper amount.

It will be noted that when the plate 17 is shifted to the position shown at the left of Figure 2, that the corresponding reset lever cannot be operated, and this corresponds to the position in which that particular set of hands is connected to the driving apparatus.

In operation the person desiring to make the measurements will drive over the ground to be measured and whenever one pair of hands reaches the proper number of feet, the lever 23 will be shifted to the opposite position. This will stop the hands which have just been moved and will start the other set of hands into motion it being presumed that they have been previously reset to zero with one of the levers 55, thereupon the attendant will either drop a marker or will, during the accumulation of the second measurement, set down on a paper or book the measurement just made and will repeat the operation as often as may be necessary.

What I claim is as follows, but modifications may be made in carrying out the invention shown in the drawings and in the above particularly described form thereof, within the purview of the invention.

1. An apparatus for measuring and separately indicating consecutive distances comprising a casing having two registers therein; means to operate said registers, a pair of locking slides, either of which is adapted to lock one register out of use when the other is accumulating, and means to shift the register operating mechanism and said slides from one position to the other at will.

2. An apparatus for measuring and separately indicating consecutive distances comprising a casing carrying a pair of registers, means to operate both of said registers from one driving mechanism, a pair of slides to lock one register out of use when the other register is accumulating, and means to connect the register driving mechanism to the register locking devices whereby the register driving devices may be shifted from one position to the other with reverse movements of the register locking device.

In testimony whereof I have hereunto set my hand this 16th day of April, A. D. 1923.

W. N. LINDBLAD.